United States Patent
Stavis

[11] 3,820,896
[45] June 28, 1974

[54] VELOCIMETER WITH IMPROVED SIGNAL TO NOISE RATIO

[75] Inventor: Gus Stavis, Croton-on-Hudson, N.Y.

[73] Assignee: The Singer Company, Little Falls, N.J.

[22] Filed: Jan. 2, 1973

[21] Appl. No.: 320,319

[52] U.S. Cl. .................................................. 356/28
[51] Int. Cl. ............................................. G01p 3/36
[58] Field of Search .............................. 356/28, 169

[56] References Cited
UNITED STATES PATENTS

| | | | |
|---|---|---|---|
| 3,508,066 | 4/1970 | Agar | 356/28 |
| 3,537,793 | 11/1970 | Shaffer, Jr. | 356/28 |
| 3,548,655 | 12/1970 | Rudd | 356/28 |
| 3,677,647 | 7/1972 | Misek | 356/28 |

Primary Examiner—Maynard R. Wilbur
Assistant Examiner—S. C. Buczinski
Attorney, Agent, or Firm—T. W. Kennedy

[57] ABSTRACT

An improved laser velocimeter in which both magnitude and sense of direction are provided and which has an improved signal to noise ratio is shown. To obtain sense of direction the conventional laser velocimeter which includes a transmitting beam and a receiver comprising a grating and a photo detector, has added to it a second grating and detector. The second grating being shifted one-quarter of a line pair from that of the first resulting in two outputs which are shifted 90 degrees from each other. This information is processed in a well-known manner to obtain an output indicative of sense of direction. To improve signal to noise ratio a grating is used with the transmitted beam to cause it to form three separate beams which when received through the receiving grating will be superimposed upon each other to cause a greater portion of the signal to be utilized by the detector.

7 Claims, 8 Drawing Figures

PATENTED JUN 28 1974 3,820,896

VELOCIMETER WITH IMPROVED SIGNAL TO NOISE RATIO

BACKGROUND OF THE INVENTION

This invention relates to laser velocimeters in general and more particularly to an improved laser velocimeter. The basic laser velocimeter used herein is described in U.S. Pat. No. 3,432,237 granted to R. A. Flower et al. on Mar. 11, 1969 and assigned to the same assignee as the present invention. As disclosed therein a laser beam is imaged on a surface moving relative to the velocimeter. The reflected radiation from the surface is received by a detector through an optical grating. The system processes this received signal to provide an output proportional to velocity. The basic system described by Flower suffers from a number of deficiencies. First, it provides an output only of velocity magnitude. In some applications where motion is always in one basic direction, e.g., in a fixed-wing aircraft or in material processing, this is no problem. But where relative motion can be either forward or backward, for example, when the velocimeter is used in a helicopter, motion direction must also be sensed. One solution to this problem is shown in application Ser. No. 117,349, filed by D. Z. Blau et al. on Feb. 22, 1971 and assigned to the same assignee as the present invention, now U.S. Pat. No. 3,737,233. In the system therein a moving grating is used along with a fixed grating to determine motion direction. Although this works quite well, it is a fairly complex system.

The other main deficiency of Flower is a poor signal to noise ratio. Expressed in other terms, the received signal is used very inefficiently. As much as 90 percent of the signal is not used in the Flower system.

SUMMARY OF THE INVENTION

The present invention provides a solution to these two problems. Direction is sensed by providing a second grating having its bars spaced from those of the first grating so as to result in a signal shifted 90° in phase. When motion is in one direction the signal from the first grating will lead that of the second, and when in the opposite direction will lag. The two signals obtained are processed using known modulation and decoding techniques to obtain an output indicative of direction.

The second improvement is in the area of signal to noise. A lens and grating are used with the radiating laser beam to provide a total of three image beams. The reflected radiation is received through an identical grating resulting in superposition of the three beams at three points greatly increasing the usable radiation at the detector and thus improving the signal to noise ratio.

DETAILED DESCRIPTION OF THE PREFERRED EMBODIMENTS

Figure 1:
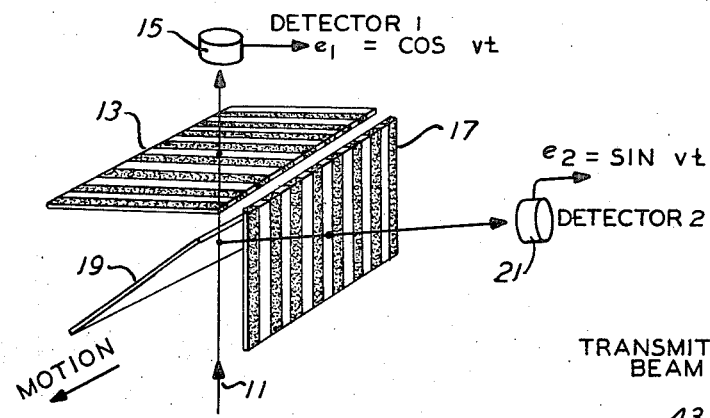
FIG. 1 is a perspective view showing the arrangement of the two gratings of the receiver used to obtain velocity sense information.

The grating arrangement required to obtain the signals needed to get the sense of direction is shown on FIG. 1. The return signal indicated by arrow 11 passes through a grating 13 and is imaged on a detector 15 to obtain the velocity information as disclosed in the Flower patent referenced above. A second grating 17 is placed so that the gratings are phased by a quarter of a line pair dimension from that of grating 13. To obtain a return signal through this grating, a beam splitting mirror 19 is used which will pass half the radiation to grating 13 and reflect the other half of the radiation to the grating 17. The phasing of a quarter line pair between grating 13 and 17 will cause the signal at detector 21 to be 90° out of phase with that of detector 15. The relative lead or lag between the output of detector 15 and detector 21 will be determined by the sense of the motion of the system. The output voltage of detector 15 can be expressed as:

$$E_1 = \cos \nu\, t$$

and the output of detector 21 as:

$$e_2 = \sin \nu\, t$$

where $\nu$ is equal to a function of the relative velocity. The processing of the signals $e_1$ and $e_2$ is shown on FIG. 2. An oscillator 23 provides outputs sine $\rho\, t$ and cosine $\rho\, t$ having a phase difference of 90°. The $e_1$ signal and the cosine $\rho\, t$ signal are provided to a conventional modulator 25. The $e_2$ signal and the sine $\rho\, t$ signal are provided to a modulator 27. The resulting outputs of modulators 25 and 27 designated respectively as $e_3$ and $e_4$ will be as follows:

$$e_3 = \cos \rho\, t \cos \nu\, t = \cos(\rho + \nu)\, t + \cos(\rho - \nu)\, t$$

$$e_4 = \sin \rho\, t \sin \nu\, t = -\cos(\rho + \nu)\, t + \cos(\rho - \nu)\, t$$

The quantities $e_3$ and $e_4$ are subtracted to give an output $e_5$ which equal to:

$$e_5 = e_3 - e_4 = \cos(\rho + \nu)\, t$$

The output $e_5$ is then provided to a sine cosine tracker 21 such as that described in U.S. Pat. No. 3,121,202 granted to J. W. Gray on Feb. 11, 1964 and assigned to the same assignee as the present invention. Also disclosed therein is the type of oscillator which may be used for the $\rho$ generator 23. From the expression for $e_5$ above, it can be seen that the $\cos(\rho + \nu)\, t$ will be dependent on the direction of the velocity, i.e., the sign of $\nu$. Thus, sine and cosine tracker 31 which has the input from the $\rho$ generator as one of its inputs is able to provide an output which indicates the sense of motion.

Figure 3:
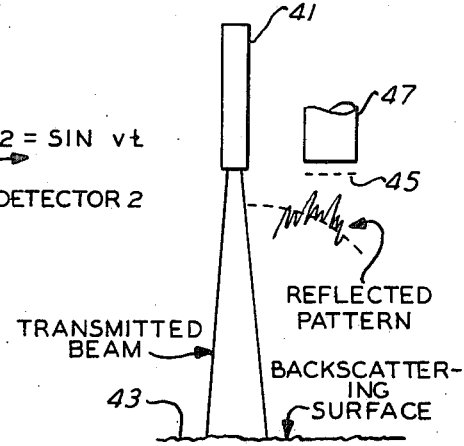
FIG. 3 is a block diagram of the basic arrangement of the prior art velocimeter.
Figure 4:
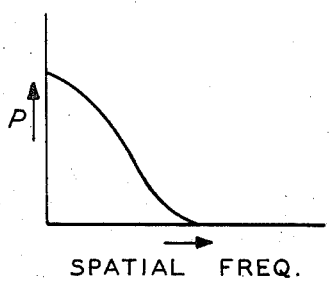
FIG. 4 is a plot of the power versus the spacial frequency of the signal of the laser of FIG. 3.
Figure 5:
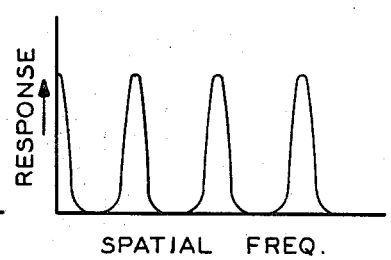
FIG. 5 is a plot of the receiver response of the receiver of FIG. 3.
Figure 6:
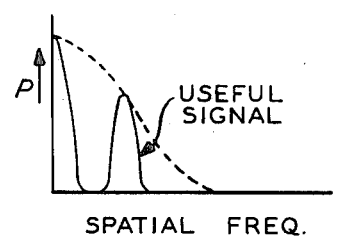
FIG. 6 is a plot of the receiver output of the receiver of FIG. 3.

With the dual grating arrangement where the received radiation is split between two detectors it is even more important that the highest possible signal to noise ratio is obtained. To understand how the system of the present invention increases the amount of radiation received, the operation of the previous system described in Flower must first be examined. FIG. 3 illustrates the basic Flower system. The laser 41 transmits a beam to a backscattering surface 43. The reflected pattern is passed through a grating 45 to a photodetector 47 and then processed. FIG. 4 is a curve showing the transmitted signal spectrum with spacial frequency plotted against power. This is essentially the content of the beam transmitted by the laser 41. The response of the receiver, i.e., photodetector 47 with the grating 45 in front is as shown on FIG. 5. The receiver output which may be found by superimposing the two curves is shown on FIG. 6. It will be noted that a large portion of the energy of FIG. 4 lies outside the response of FIG. 5 and thus is not useful in the receiver.

Figure 2:
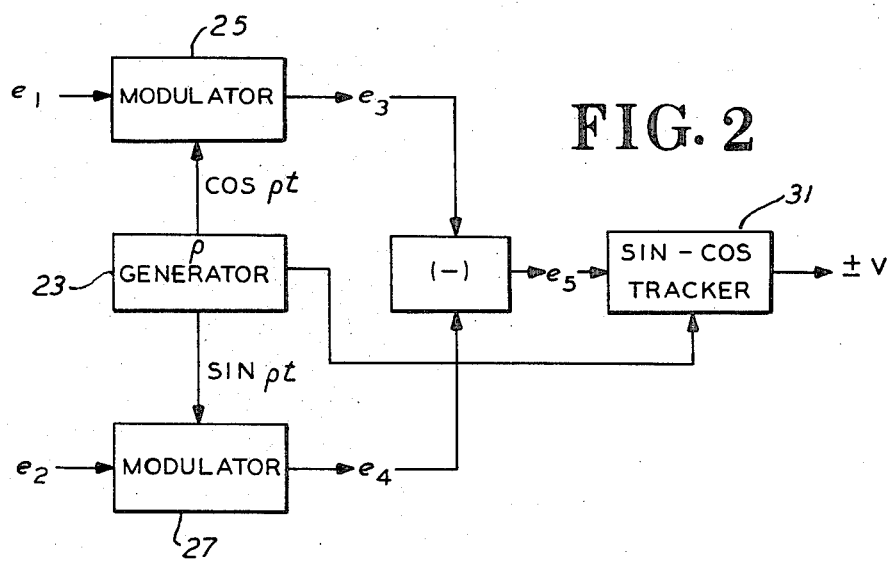
FIG. 2 is a block diagram of the system which decodes the outputs of the detectors of FIG. 1 to obtain a signal indicative of velocity sense.
Figure 7:
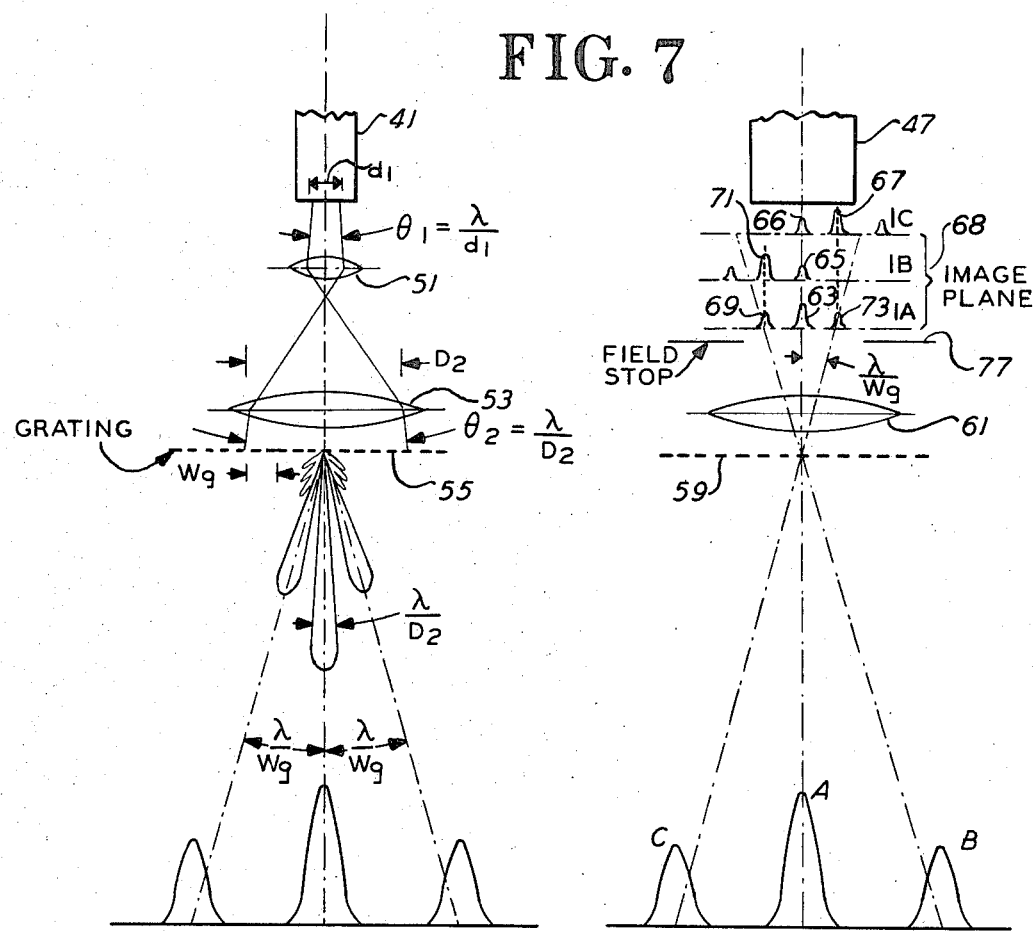
FIG. 7 is an elevation view of a preferred embodiment of the optical portion of the present invention providing improved signal to noise ratio.
Figure 8:
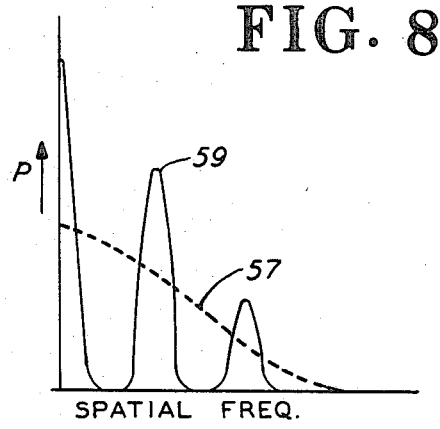
FIG. 8 is a plot illustrating the signal spectrum of the system of FIG. 7.

The preferred embodiment of the velocimeter of the present invention is shown in FIG. 7. The system shown is for a single detector 47, however, it will be recognized that a duplicate receiver with a second grating and detector may be provided as shown in FIGS. 1 and 2. The beam from laser 41 which has an initial diameter of $d_1$ is increased in diameter by lenses 51 and 53 to obtain a diameter $d_2$. This will produce a single beam with an angular width $\theta = \lambda/d_2$. A grating 55 with a spacing $W_g$ and a slit width $W_g/2$ is placed in front of lens 53. This results in the splitting of the single beam into three beams shown, each of which will have a beam width of $\lambda/d_2$ and angular separation of $\lambda/W_g$. Thus, three areas on the ground will be illuminated by the radiation from laser 41. The spatial spectral power density of any one of the three beams would have the density shown by the dotted curve 57 of FIG. 8. The simultaneous presence of the three illuminated areas produces a pattern having spatial frequency distribution shown by the solid curves 59 of FIG. 8. Thus, because of the inclusion of the grating 55, the backscattered signal is concentrated as specific spatial frequencies rather than broadly distributed.

The receiver is located so that the optical leverage between the transmitter and the receiver is 2. The grating 59 of the receiver is made identical to the grating 55 used in transmitting the beams. A lens 61 is placed behind the grating to image the beam on the detector 47. The grating will cause three sets of images indicated as IA, IB and IC, each corresponding to one of the three illuminated areas, to be formed at the image plane 68. As illustrated, the grating causes each of the beams A, B and C to form a principle image and two smaller images of each side thereof. These sets of images will all be at one plane as indicated by the brackets on FIG. 7. They are shown separated only for purposes of illustrating the contribution of each beam to the total image. The central or principal image 63 of the central beam will have superimposed on it the second order image 65 resulting from beam B and the second order image 66 resulting from beam C. The one second order image of beam A will have superimposed on it the principal image of 71 of beam B, and the other second order image 73 of beam A will have superimposed on it the central image 67 of beam C. All of these composite images will have the same amplitude fluctuation which will be at a frequency centered at the value $2V/W_g$ where V is the velocity of the system over the backscattering surface and $W_g$ is the grating wave length. Thus, the received radiation is greatly increased thereby increasing the signal to noise ratio. By placing a field stop 77 at the image plane, the background illumination due to sunlight or other light can be excluded from the field of view. By reducing the detector to the diameter enclosing the images, the dark current of the detector can be reduced in proportion to the decrease in photocathode area further increasing the signal to noise ratio.

Thus, an improved laser velocimeter which provides an output indicative of the sense of direction of the velocity and has an improved signal to noise ratio has been shown. Although a specific embodiment has been shown and described it will be obvious to those skilled in the art, that various modifications may be made without departing from the spitit of the invention which is intended to be solely by the appended claims.

What is claimed is:

1. In a laser velocimeter comprising at least a laser transmitter transmitting a beam to a reflecting surface, a receiving including a first optical grating and first photo-detector and means to obtain velocity magnitude from the received signal, apparatus to provide velocity sense and to provide an improved signal to noise ratio comprising:
  a. lens apparatus adjacent said laser to provide a wider beam;
  b. a second optical grating placed adjacent to and on the side of said lens apparatus closest the reflecting surface whereby three beams will be transmitted by said laser-transmitter;
  c. a first lens to image the radiation received by said first grating on the first photo-detector;
  d. a third grating positioned with the lines thereon a quarter grating cycle from said first grating;
  e. means to split the received radiation between said first and third gratings;
  f. a second photo detector;
  g. a second lens to image the radiation received by said third grating on said second photo detector; and
  h. means to obtain from the outputs of said first and second detectors a signal indicative of velocity sense of direction.

2. The invention according to claim 1 wherein said means to obtain said signal indicative of velocity sense comprise:
  a. a reference oscillator providing first and second outputs of equal frequency but shifted in phase by 90°;
  b. a first modulator having the output of said first detector as a signal input and said first oscillator signal as a modulation input;
  c. a second modulator having the output of said second detector as a signal input and the second output of said oscillator as a modulating input;
  d. means to subtract the outputs of said first and second modulators;
  e. a sine-cosine tracker having the output of said subtractor and an output of said oscillator as inputs and providing said velocity sense signal as an output.

3. The invention according to claim 1 and further including aperture stops at the image planes of said first and second photo detectors.

4. The invention according to claim 1 wherein said means to split said received radiation comprises a beamsplitting mirror.

5. In a laser velocimeter comprising at least a laser transmitter transmitting a beam to a reflecting surface, a receiver including a first optical grating and photo-detector and means to obtain velocity magnitude from the received signal, apparatus to provide an improved signal to noise ratio in said velocimeter comprising:
   a. lens apparatus adjacent said laser to provide a wider beam;
   b. a second optical grating placed adjacent to and on the side of said lens apparatus closest the reflecting surface whereby a plurality of beams will be transmitted by said laser transmitter; and
   c. a lens to image the radiation received by said first grating onto said photo-detector.

6. The invention according to claim 5 and further including aperture stops at the image planes of said photo-detector.

7. The invention according to claim 5 wherein said first and second optical grating are identical and said laser transmitter and said receiver are positioned to effect an optical leverage of two.

* * * * *